Jan. 23, 1968        M. D. MILLER ETAL        3,365,331
                     SUGAR PROCESS AND PRODUCT

Filed July 6, 1964                            2 Sheets-Sheet 1

INVENTORS
MARVIN D. MILLER
MAX COHEN
CHARLES P. GRAHAM

Thomas F. Moran
ATTORNEY

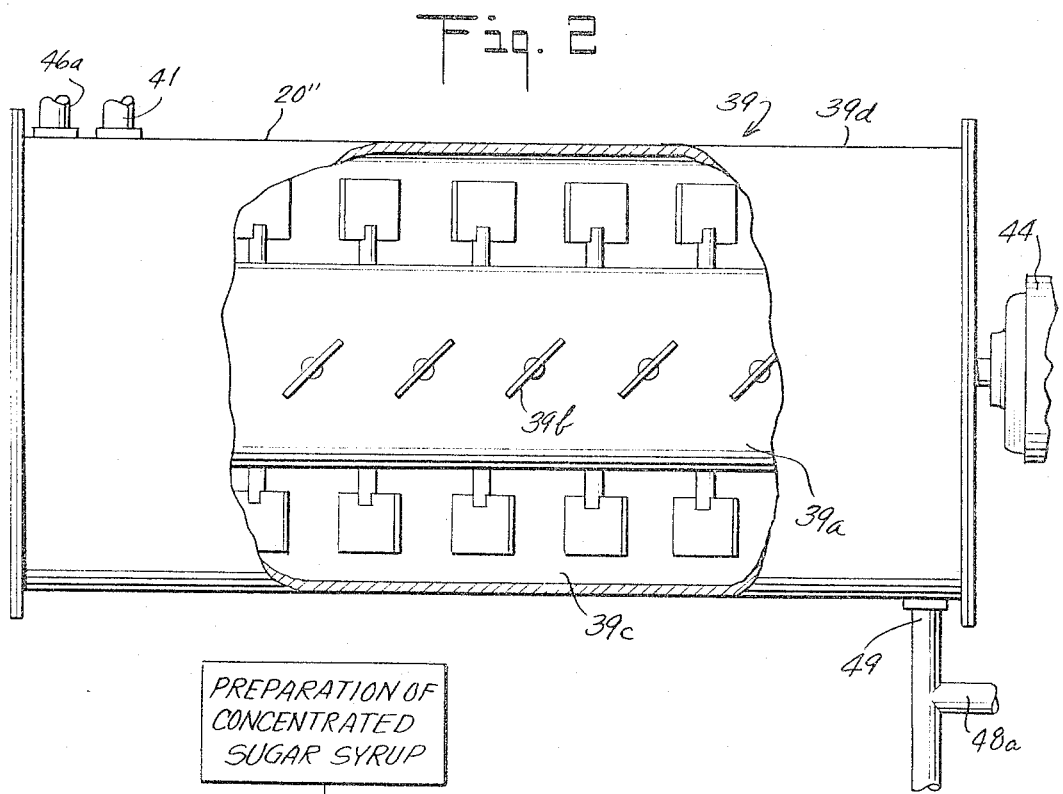

United States Patent Office 3,365,331
Patented Jan. 23, 1968

3,365,331
SUGAR PROCESS AND PRODUCT
Marvin D. Miller, Oceanside, Max Cohen, Utopia, and Charles P. Graham, Hicksville, N.Y., assignors to American Sugar Company, New York, N.Y., a corporation of New Jersey
Filed July 6, 1964, Ser. No. 380,228
4 Claims. (Cl. 127—30)

ABSTRACT OF THE DISCLOSURE

A granular, free-flowing, non-caking sugar product comprised essentially of aggregates of fondant-size sucrose crystals, such as a free-flowing brown sugar product, is obtained by concentrating a sugar syrup at a temperature not higher than about 130° C., such as a temperature in the range 120–130° C., to a solids content in the range 91–97% by weight. The resulting concentrated sugar syrup should contain not more than 15% by weight non-sucrose solids based on the solids content of the concentrated syrup. The concentrated sugar syrup is then subjected to crystallization within a crystallization zone wherein the concentrated sugar syrup is subjected to impact beating. During the crystallization operation involving impact beating gas, such as air, is flowed through the crystallization zone to effect some cooling of the crystallizing concentrated sugar syrup and the resulting crystallized sugar product and to sweep out the released moisture. Desirably, thee retention time of the sugar material introduced into the crystallizing zone is in the range about 10–60 seconds. After impact beating within the crystallization zone there is recovered a granular sugar product comprised of aggregates of fondant-size sucrose crystals, the sucrose crystals having a size in the range 3–50 microns, and having a moisture content below about 2.5% by weight.

---

This invention relates to granular, free-flowing, non-caking sugar products comprising essentially aggregates of fondant-size sucrose crystals.

Sugar crystals which comprise essentially sucrose, when interspersed with sticky and/or hygroscopic materials (natural or artificial), present caking and non-free-flowing problems. Brown sugar contains molasses-like components that are hygroscopic, and therefore brown sugar falls within this class. While specific reference is made to brown sugar, the principles of the invention are applicable with all other members of the class exhibiting this problem.

It has been well known in the sugar refining art that brown sugar could be rendered granular and free-flowing if the size could be reduced to a uniform product of fondant-size (3–50 microns crystal size, more or less). The problem was well recognized, and was understood to be that large size crystals of brown sugar containing a relatively thick outer coating of the aforesaid sticky molasses-like components which cause neighboring crystals to cake and become non-free-running. If brown sugar could be crystalized to extremely fine crystals, although the proportion of the molasses-like components would remain the same, the distribution thereof over the very greatly increased area per unit weight would eventually at some point in descending crystal size create such a thin film of molasses-like components on the crystals that the aforesaid sticking and caking of adjacent crystals would not take place.

Brown sugar is notorious to those familiar with the cooking and baking arts to be a tasty and highly desirable culinary resource, but to be equally difficult to deal with because of the aforesaid problem of sticking and caking. There has long been a very pronounced desire on the part of consumers and users to have a fine and free-running brown sugar. The advantages of such a material are obvious, and include ease of measuring, ease of distribution and spreading, and many other practical advantages.

Although as aforesaid the problem itself poses the theoretical solution thereof, in that reduction of the crystal size should eventually produce the desired product, the provision of a practical process for achieving the production of fondant-size brown sugar crystals has eluded the art. To those familiar with the sugar refining art, the reasons why this is so are obvious. Sugar is a relatively low priced article which nevertheless receives extremely careful and close scrutiny by the user thereof, and consequently all criteria of quality control, particularly those relating to taste and appearance, are vital to determining whether or not a proposed process or improvement relating to sugar production is at all useful. In other words, production of fondant-size crystals and of brown sugar must not involve undue expense, must be a full scale flow process, and must not interfere with the desirability of the product in any other way.

In the copending patent application Ser. No. 270,355 by Dorr E. Tippins et al., fired Apr. 3, 1963 and entitled "Sugar Product," now U.S. 3,194,682, assigned to the common assignee of the present invention and application, there is disclosed and claimed a process for attaining the aforesaid fondant-size crystals of brown sugar resulting in the desired granular, free-flowing, non-caking sugar product. The present invention constitutes an improvement over the invention of that application, residing primarily in the attainment of a desirable process from the standpoint of the aforesaid manufacturing criteria such as quality control, economy, and the like. In addition there is a beneficial improvement in the size and nature of the product produced in accordance with the present invention.

Accordingly, it is an object of this invention to provide an improved process for the manufacture of sugar products.

Another object of this invention is to provide an improved process for the manufacture of sugar products containing aggregates of fondant-size sucrose crystals.

Still another object of this invention is to provide a sugar product consisting essentially of fondant-size sucrose crystals, said product having improved properties with respect to storage or shelf life, flowability and caking resistance.

Yet another object of this invention is to provide an improved process for the manufacture of sugar products wherein the process is capable of handling a wide variety of sucrose-containing streams or syrups and capable of producing a wide variety of sucrose-containing products of improved physical properties with respect to flowability and caking resistance.

How these and other objects of this invention are obtained will become apparent in the light of the accompanying disclosure made with reference to the accompanying drawings wherein:

FIG. 1 is a process flow diagram schematically illustrating a process in accordance with this invention for the manufacture of a sucrose-containing sugar product consisting essentialy of aggregates of fondant-size sucrose crystals;

FIG. 2 is schematic representation of the beater crystallizer shown in the flow diagram of FIG. 1 and showing internal details of construction; and FIG. 3 is a block diagram of steps involved in the practice of the present invention.

In accordance with the invention it has now been discovered that violent impact of an order of magnitude previously deemed unworkable is capable of very quickly crystallizing the concentrated sucrose containing sugar syrup (e.g., 91–97% solids; not more than about 15% non-sucrose solids, both by weight) and that forced air flow during said violent beating provides a uniform color, non-burned, superior free-flowing product.

The practice of the present invention has come as a distinct surprise to those familiar with the sugar treatment arts, and to those additionally familiar with the operation of the Werner-type beater crystallizer described in the assignee's patent, U.S. 3,194,682. The particulars of this wholly unexpected result will be detailed hereinbelow, but it will be helpful to understanding to point out here that it was known that the concentrated syrup, under agitation as by the Werner-type beater, first begins to show incipient crystallinity, then turned to a very viscous dough, and then broke-up into individual sugar aggregates of crystals. The doughy intermediate stage, by all sensible engineering criteria, seemed to completely preclude impact-type beating, and it seemed that jamming and freezing-up mechanically of impact-type equipment with such a doughy mass was inevitable. However, surprisingly, the impact and very intense beating practiced with the present invention either passes through the doughy stage before harm can be done, or by some sublimation-type mechanism, avoids the doughy stage altogether. This discovery was totally unexpected, and completely unpredicted from previous experience. Not only is process (beating) time reduced from the order of two minutes to the order of 10 seconds, but the product is superior in several respects, which also was totally unexpected. The superiority of this improvement is only attainable, however, under conditions of forced air flow during the aforesaid impact-beating, as will be described hereinafter.

For the most part, the sugar products prepared in accordance with this invention are derived from feed sugar syrups ranging in purity from between about 85 to about 97%. When a sugar product is desired having a flavor intensity equivalent to the commercial grades of soft or brown sugars, it is generally desirable to employ a feed sugar syprup having a purity of about 94% or less. The feed syrups employed in the practice of this invention can be produced, generally with consistent quality, from straight or blends of cane refinery syrups, including pure sucrose syrups, granulated syrups, soft syrups and/or mechanically filtered syrups, such as re-melt syrups, black strap and affination syrup as produced in a typical sugar refinery, or after further processing of such syrups to produce a syrup suitable for conventional soft sugar manufacture.

The non-sucrose solids in the feed syrups in the practice of this invention may also consist entirely, or in part, of inverted sucrose (equal portions of dextrose and levulose, so-called invert) or other reducing sugars manufactured by conventional starch conversion processes and generally referred to as corn syrups, potato syrups, dextrose, maltose and the like. The non-sucrose solids in the feed syrups may also consist of lactose and sugars derived from such diverse materials as honey, maple syrup and the like. Additionally, if desired, the non-sucrose solids might also be derivable from molasses or molassegenic components of black strap molasses, including the flavor and/or color components and ash-forming constituents, the invert portions thereof and the like, as well as materials from an extraneous source not usually produced, separated and/or recovered in a sugar refinery.

The feed sugar syrups employed in the practice of this invention, as generally indicated hereinabove, can be produced from a variety of sugar syrup blends. For example, one component of a feed sugar syrup in the practice of this invention may consist of pure sucrose syrup. In the practice of this invention a feed sugar syrup suitable for the production of a flavorful sugar product would be a 93% purity feed sugar syrup consisting of a blend of sugar syrups composed of about 84 parts sugar syrup of 100% purity and 16 parts cane refinery soft syrup of about 55% purity, assuming such syrups are of substantially equivalent Brix.

Referring now to FIG. 1 of the drawings, there is schematically illustrated therein a flow diagram for the production of sugar products having special properties in accordance with this invention. A stream of sugar syrup from a suitable source, such as a granulated sugar syrup, is supplied via line 10 to mixing tank 11. There is also added to mixing tank 11 via line 12 another stream of sugar syrup of suitable purity so as to produce in mixing tank 11 after mixing by means of agitator 14 a uniform blend of sugar syrup having a purity in the range 85–97.

The resulting blend of syrup is supplied from mixing tank 11 via line 15 to pump 16 from which it is delivered via line 18 through a suitable flow control device, such as rotameter 19, the control of the flow through rotameter 19 being regulated by means of flow control valve 20a located in the output or effluent line 20 from rotameter 19. After passing through flow control valve 20a the syrup blend is supplied via line 20 to a suitable preheater such as tubular heater 21 provided with steam as the heating fluid, the steam to heater 21 being supplied via line 21a and the condensed steam issuing therefrom via trap 21b.

The heated sugar blend issues from heater 21 via line 22 which is provided with a suitable thermometer 22b for observing the temperature of the sugar syrup and/or to control the operation of heater 21 so that the sugar blend issues therefrom at a suitable temperature. Line 22 supplies the heated syrup blend to concentrator 24 which is also supplied with steam as the heating fluid via line 24a, the condensate being recovered via trap 24b. The resulting heated syrup blend issues from concentrator 24 via line 25 at a temperature not greater than about 120–130° C. Thermometer 25a is provided in line 25 to observe the temperature of the syrup blend issuing from concentrator 24 and to control the operation of concentrator 24 so as to prevent the syrup blend therein from being heated to a temperature above 120–130° C.

The heated syrup blend is passed from concentrator 24 via line 25 into vapor separator 26 which desirably, as illustrated in the drawing, is maintained under a suitable reduced pressure or vacuum. Manometer 28, connected to vapor separator 26 via tube 28a, serves as a means to observe the reduced pressure or vacuum within vapor separator 26. Reduced pressure or vacuum is maintained within vapor separator 26 by means of vacuum pump 29 which is in communication with vapor separator 26 via line 30, condenser 31 and line 32. Condenser 31 is supplied with condensing water via line 34 which has water flow control valve 34a therein. Steam leaving vapor separator 26 via line 32 is condensed by contact with the condensing water therein and resulting water and condensate is discharged via leg 35 into sump or well 36. Air bleed valve 30a is provided in line 30 as a suitable means for adjusting and/or maintaining the desired vacuum or reduced pressure within vapor separator 26.

In the operation of the process of this invention for the preparation of marketable sugar products, it has been found that the concentration of the syrup blend within concentrator 26 should be carried out to a solids content of about 91–97% by weight, the resulting concentrated syrup being recovered from vapor separator 26 via line 38. As illustrated in FIG. 1 of the assignee's patent, U.S. 3,194,682, at atmospheric pressure the temperature required to concentrate a given syrup in order to attain a desired high degree of solids content, such as about 95% solids, is a function of the syrup purity, i.e. percent sucrose in the total dissolved solids content of the syrup. In processes employed heretofore when syrups of relatively low purity, below about 95%, were concentrated to approximately 91–97% solids, concentrating temperatures above 125–130° C. were employed, the concentration operation being carried out at atmospheric pressure.

As illustrated in FIGS. 2 and 3 of the assignee's patent, U.S. 3,194,682, sugar syrups heated to a temperature above 125–130° C. undergo significant degradation as indicated by a decrease in feed syrup pH and by an increase in feed syrup and final sugar product color. Degradation occurs even when the time required for syrup concentration is very low and the concentration operation is carried out rapidly such as by utilizing low retention time continuous heaters and concentrators. However, to whatever degree sugar degradation takes place such degradation is undesirable in that the products of degradation tend to reduce the rate at which crystallization can be carried out, thereby leading to the formation of undesirably large sugar crystals in the subsequent crystallization operation. The presence of large sugar crystals in the products of this invention is undesirable since large crystals reduce the anti-caking characteristics of the sugar product. It is a feature of the present improvement invention that crystallization is conducted so rapidly, and crystal size is so normally low within the fondant-size range, that a relatively high degree of syrup degradation can be tolerated with attainment of a commercially acceptable end-product nevertheless. Of course, when syrup degradation is held down, this advantage manifests itself in improved product color, uniformity, and crystal size.

The rate of syrup degradation at elevated temperatures above about 125–130° C. is highly dependent upon the nature of the non-sucrose solids present in the sugar syrup. In commercial practice it is not feasible to attempt to control the nature of these non-sugars. These materials vary with the country of origin of the raw sugar from which the sugar syrups are derived and with varying plant refinery techniques and refinery operating schedules and other conditions. Accordingly, different syrups of the same purity concentrated at a given elevated temperature to a desired solids content, even during a given fixed heating period, tend to exhibit different quality characteristics, such as color and pH. Accordingly, on a practical commercial basis it is substantially impossible to produce a sugar product of uniform and reproducible quality and physical characteristics when the syrups from which such sugar products are derived are heated to an elevated temperature above about 125–130° C.

Further, in the operation of vapor separator 26 care should be taken not to carry out the concentration of the syrup blend under conditions, such as in the presence of sugar crystals, which result in inducing crystallization. If crystallization is induced within concentrator 24 or vapor separator 26 or in the concentrated syrup issuing therefrom via line 38 prior to introduction into beater-crystallizer 39, the rate of crystallization within beater-crystallizer 39 will be slowed down. A slower rate of crystallization results not only in the formation of larger crystals but in the production of a wetter final sugar product. Further, for example, if in the operation of vapor separator 26, the syrup blend therein is concentrated beyond a certain point at a relatively low temperature, such as substantially below about 120° C., crystallization tends to spontaneously occur.

It is a feature of the present invention that the rate of crystallization is so rapid in beater-crystallizer 39, and the effects of forcing the critical amount of air therethrough are so beneficial, that a certain amount of this crystallization prior to the beater-crystallizer 39 itself can be tolerated without making the end product unacceptable. Alternatively, of course, if crystallization before beater-crystallizer 39 is held down, the advantages of the invention manifest themselves in a superior end-product in color, size, uniformities, and the like. Here as throughout this description it will be apparent that the surprising effect of impact-beating the syrup in the presence of forced measured air flow, is responsible for these advantages, in that the other portions of the flow diagram are rendered less critical and sensitive. In the sugar arts, where as is explained elsewhere, the starting products are never fully uniform, this lowering of sensitivity of so many parts of the flow diagram with attendant increase of product quality nevertheless, is of immense practical significance.

The relatively hot concentrated syrup is passed via line 38 to pump 40 from which it is transferred via line 41 to beater-crystallizer 39. The hot concentrated syrup should have a solids content in the range 91–97% by weight. Beater-crystallizer 39, as generally indicated in FIG. 1, is a closed vessel provided with a rotatable shaft 39a mounted axially therein and provided with radial projections, blades or paddles 39b. Suitable means, such as motor 44, operatively connected to shaft 39a serves to rotate shaft 39a and paddles 39b within beater-crystallizer 39.

The essence of the operation of the beater-crystallizer 39 according to the present invention, is the combination of impact, turbulence, and shear (all in very high intensity) to effect very rapid crystallization of the syrup fed to beater-crystallizer 39 at 41 into granules. One apparatus suitable for effecting such combined action is the so-called Turbulizer manufactured by the Strong-Scott Manufacturing Company, Minneapolis, Minn.

In FIG. 2 is shown a schematic representation of a Turbulizer by the aforesaid manufacturer when employed as beater-crystallizer 39. The casing 39d is generally cylindrical in external outline, and is generally cylindrical in internal configuration. A central shaft 39a is of generous diametric proportions compared to the diameter of the cylinder 39d itself. For example, in a 20" inside diameter cylinder 39d, a shaft 39a of say 9" outside diameter gives satisfactory results. The blades or paddles 39b may be set at any angle (e.g. 45°) having a sense appropriate to advance the feed from the end adjacent inlet 41 to the end adjacent outlet 49. The clearance 39c must be modified from the narrow clearance supplied by the aforesaid manufacturer, and in a unit having the aforesaid dimensions, and being approximately 36" from inlet 41 to outlet 49, a clearance 39c on the order of magnitude of 1½" is best. This clearance provides a channel for sugary material through-put and prevents hard caking of the sugary material on the inner walls of cylinder 39d with resultant heat build-up and change in through-put and other deleterious phenomena. With the aforesaid dimensions a blade or paddle 39c of approximately 1½" width is appropriate.

The unit 39, when a Turbulizer by the aforementioned manufacturer is employed, is run in the order of magnitude of 1,000 r.p.m., and over, while the prior equipment of the assignee's copending application is run at an order of magnitude of 200 r.p.m. The difference in speeds amounts to the difference between stirring and impacting, with the material in question. Further discussion of the operation of a beater-crystallizer 39 according to the invention will be made hereinbelow after description of the remainder of the general flow diagram of FIG. 1.

Referring again to FIG. 1 of the drawings, a fan 46 forces air into the end of beater-crystallizer 39 adjacent syrup feed 41, that is at 46a, while another fan 48 draws air out of the outlet 49 end of beater-crystallizer 39, that is at 48a. The amount of air forced along with the sugar substance through the length of beater-crystallizer 39 is important to the superior result of the invention, as will be more specifically set forth hereinbelow. The product emanating from outlet 49 is aggregates of sugar crystals in the fondant-size, that is, 3–50 microns. The aggregate sugar product issuing via discharge line 49 from beater-crystallizer 39 is introduced into dryer-cooler 50. Upon introduction into dryer-cooler 50 the aggregate sugar product is at a temperature in the range about 50–125° C. and has a moisture content in the range about 0.5–2.5% by weight, such as about 1.0% by weight. Dryer-cooler 50 may be any suitable commercially available dryer-cooler, such as a tray dryer or a rotary dryer, such as a Hersey granulator or a Roto Louvre granulator or a separate dryer and a separate cooler.

Ambient air is supplied via line 51 through heater 52 and conduit 54 into dryer-cooler 50 to effect drying of the sugar product therein. The air is removed from dryer-cooler 50 via discharge conduit 55 and exhaust fan 56. Additional air, such as for cooling purposes, or to modify the drying-cooling conditions within dryer-cooler 50, is supplied via lines 51 and 58.

The resulting dried, cooled sugar product is removed from dryer-cooler 50 via line 59 and supplied to a suitable size reduction apparatus, such as comminuting mill 60 or transferred via lines 59 and 57 to screening unit 62. The resulting finely divided, comminuted product is discharged via line 61 and passed to size separating or screening unit 62, oversize material, e.g. +14 mesh, being returned via line 64 to comminuting mill 60 or being separately recovered as product, and the undersize material or fines, e.g. −48 mesh, being recovered via line 65 and returned to beater-crystallizer 39 via line 66 if desired. Also, fines are recovered as product as such via line 65 or after blending with a suitable additive material, such as powdered starch or other material, added to line 65 via line 68. A granular product of desired size, e.g. −14 mesh +48 mesh, is recovered from sizing unit 62 via line 69.

Concerning the comminuting operation carried out in comminuting mill 60, the size reduction can be carried out satisfactorily before or after drying. As a size reduction unit, a Fitzmill Comminuter equipped with 16 knife blade hammers rotating at 3000 r.p.m. and provided with a $7/16''$ round hole screen has been found to be satisfactory.

The drying of the product as it leaves beater-crystallizer 39 is a relatively simple operation. Desirably, the drying operation is carried out under conditions such that the sugar aggregates are maintained in motion in order to insure uniform distribution of drying gas, such as hot air, around the individual aggregates. When the drying operation is carried out in this manner, a thorough drying can be accomplished within a relatively short period of time, such as within about 2 minutes, employing air at a temperature of about 130° C. Vibratory type conveyor dryers may also be satisfactorily employed for dryer-cooler 50. A satisfactory drying involves reduction of the moisture content from about 1.0–2.5% to about 0.5%, preferably below about 1%.

It should be clearly understood that an important feature of the invention is that crystallization is so rapid as to be virtually instantaneous, and that one result of this fact is that feed syrups of lower purity may be crystalized to yield an essentially dry product direct from the beater-crystallizer 39. By virtually instantaneous is meant 1–10 seconds, and by essentially dry is meant without discernible moisture in appearance and in free-running characteristics. On analysis, that degree of dryness includes the 1.0–2.5% moisture content product obtainable directly from beater crystallizer 39. The subsequent drying step to reduce the moisture still further is an optional commercial procedure where still further dryness is desired. Such additional drying is of course expedited by the low initial moisture content. Without instantaneous crystallization, many feed syrups cannot be made to yield a usable product because of excess moisture content in the first instance.

Screening of the dryer product is readily carried out by means of any suitable commercially available screening unit. It has been observed that the sugar product is relatively resistant to abrasion. The fines product, i.e. aggregates having a particle-size less than about −48 mesh, however, tend to absorb an excessive amount of moisture. It has been found desirable to carry out the comminuting and screening operations under controlled conditions of relative humidity in order to prevent the product fines from becoming sticky and clogging or blinding the screen. This difficulty can readily be avoided by carrying out the comminuting and sizing or screening operation under conditions of controlled humidity.

In preparing a blend of refinery syrups, such as within the range 85–91% purity, as feed syrup in the process of this invention, it has been found desirable to determine in such blend if there is an amount of invert sugar (a 50–50 mixture of levulose and dextrose), over that originally present in the raw sugar from which the syrup was derived. Any amount of excess invert found would be due to poor refinery techniques unless intentionally added. In this relatively low syrup purity range, it has been found that an excess amount of invert sugar in the total non-sucrose solids in the syrup is particularly undesirable since it tends to lower caking resistance in the final sugar product. It is a feature of the invention, as already mentioned, that the instantaneous crystallization tends to offset this deleterious effect of relatively low purity feed syrup.

One technique in determining the excess invert content is to measure the invert to ash ratio in the syrup blend. This ratio should not exceed about 3.0 based on an 85–91% purity syrup. Generally, the invert to ash weight ratio in raw sugar is in the range 2.0–2.5 and approximately equivalent proportions or amounts of invert and ash are removed in normal sugar refining operations. Accordingly, if sugar refining operations are proceeding normally the invert to ash ratio should remain substantially unchanged in granulated and remelt syrups. A ratio of 3.0–3.5 or above for any of these syrups is an indication that some inversion is taking place during the sugar refining operation. Higher invert to ash ratios of syrups, however, are tolerable for higher purity feed syrups. Accompanying Table I sets forth a satisfactory and suitable safe invert to ash ratio of feed syrups for various purity feed syrups to produce a satisfactory and marketable final sugar product.

TABLE I

| Feed syrup purity: | Invert to ash ratio (I/A) desirably not exceeded |
|---|---|
| 85–91 | 3.0 |
| 91–93 | 3.5 |
| 93–97 | Not critical |

In the practice of this invention it is preferred that when feed syrups containing invert are employed, the invert be not more than 12% by weight of the feed syrup, desirably not more than 8% by weight.

To improve product color and to increase sugar product "bloom" various special additive materials, such as minor amounts of phosphoric acid or minor amounts of various salts of phosphoric acid, such as the alkali metal salts, e.g. sodium salts, preferably in the form of a saturated aqueous solution, may be added to the concentrated syrup just prior to or as it is introduced to the crystallizer or even, if desired, to the syrup within the concentrator. The materials tested and the amounts found effective are set forth in accompanying Table II:

TABLE II

| Material | Formula | Percent by Weight Based on Syrups Solids |
|---|---|---|
| Phosphoric acid | $H_3PO_4$ | 0.1–0.8 |
| Monosodium dihydrogen phosphate | $NaH_2PO_4$ | 0.1–0.8 |
| Disodium monohydrogen phosphate | $Na_2HPO_4$ | 0.1–0.8 |
| Trisodium phosphate | $Na_3PO_4$ | 0.1–0.8 |

These additive materials do not appear to alter the inventive product characteristics other than color. Other salts besides the above sodium salts of phosphoric acid, including potassium, calcium and magnesium phosphates, as well as other acids and their salts, including citric acid and ascorbic acid, are also useful.

It is, again, a feature of the invention that impact beating in beater-crystallizer 39, as taught herein, produces a product having an improved bloom over product crystallized more slowly, as for example by non-impact agitation such as with a Werner-type apparatus taught in the assignee's patent, U.S. 3,194,682. To a large extent then, the desirable bloom is attainable with the present invention without any additives at all, or alternatively, when additives are used, as good bloom is achieved with less criticality of process variables before and after the beater-crystallizer 39.

The sugar products prepared in accordance with this invention are particularly useful as a carrier for other materials. These other additive materials which may have a food value or a taste value or a color value or a medicinal value and the like, can suitably be introduced at substantially any step in the process, such as during concentration, crystallization, comminuting, screening or by a separate blending and mixing operation with the sugar product, depending upon the nature of the additive material.

For example, if the additive material is water-soluble and substantially non-volatile, e.g. inorganic salt, it may be introduced to the syrup blending tank along with the syrup before concentration or directly to the concentrator such as in the form of a solution, or to the crystallizer or beater in similar form. If the additive material is temperature sensitive or substantially insoluble or if it is desired not to introduce the additive material in solution form, it may be added dry to the crystallizer or to the sugar product during drying or during comminuting and/or during screening. If the additive material is soluble in a food grade, volatile, organic liquid, such as ethyl alcohol, it can be introduced along with the concentrated syrup to the crystallizer.

It is generally desirable to introduce the additive material as early in the process as practical in order to insure maximum homogeneity of the final product. Solid, insoluble, additive material desirably should not be incorporated or present in the syrup during concentration since these solid materials would tend to promote premature crystallization. These solid additive materials are preferably added during the crystallizing operation. There the additive materials are thoroughly mixed in the first stage of the crystallizing operation as the syrup is transformed from the liquid form to a paste form. When the material within the crystallizer has reached about midway or less down the length of travel of the material through the beater-crystallizer the resulting aggregate material is a good blend of the sugar product and the additive material.

For example, vitamins such as vitamin D in an amount of about 30 mg. per ounce of sugar product may be incorporated therein. Vitamin additive material may be added to the syrup, before or after or during concentration, in the case of heat stable vitamin material, or during crystallization, drying or screening in the case of heat labile vitamin material. Pharmaceutical additive materials in any proportions depending upon the particular pharmaceutical desired, may be incorporated therein. Various pharmaceutical materials which may be incorporated in the sugar product include dicalcium phosphate and, in the lower concentration range, the various antibiotics. Spices or flavoring agents in the range 0.1% and over by weight, depending upon the flavor level desired and the particular spice, may be incorporated in the sugar product. Suitable such materials include garlic powder, cocoa and cinnamon. Also, various inert filler materials in any proportions, such as microcrystalline cellulose (Avicel), carboxymethylcellulose, may also be incorporated therein. Further, the various starch conversion products, such as tapioca starch, corn starch, esters of starches and the solubilized starches in an amount in the range 0.5–25% by weight may be incorporated in the sugar product. Also, various other materials, such as potato syrup (wet basis) and honey and maple syrup in the amount 0.5–25% by weight may be incorporated in the sugar product.

The crystallization operation will now be described in some detail, with regard to each of FIGS. 1, 2, and 3. In the operation of beater-crystallizer 39 concentrated syrup blend is introduced into one end thereof via line 41 and, assuming beater-crystallizer 39 is a Turbulizer-type beater-crystallizer as schematically illustrated in FIG. 2, a crystallized sugar product consisting essentially of aggregates of fondant-size sucrose crystals is recovered from the other end of beater-crystallizer 39 via line 49.

The operation of beater-crystallizer 39 for the conversion of a concentrated syrup into substantially dry-appearing aggregates of fondant-size sucrose crystals will not vary significantly with ambient temperature and humidity conditions, as well as the purity of the syrup supplied thereto, because of the complete control over the characteristics of the sugar product of beater-crystallizer 39 by the impact-beating phenomenon itself. The retention time of the material being processed within crystallizer 39 may be altered by varying the shaft speed of shaft 39a. Alternatively, the pitch of paddles 39b can be decreased to increase retention time, or the spacing 39c can be increased. It is estimated that the average particle retention time in beater-crystallizer 39 at a shaft speed in the range about 1000–1400 r.p.m. is in the range from about 10 to about 45 seconds (assuming 45° paddle setting and assuming a syrup feed rate of about 140 pounds of solids per minute). The operable retention time is at least until crystallization is completed and at least 30 seconds is preferred. This extremely low retention time is made possible by the virtually instantaneous crystallization of the syrup upon impact with the first few blades in beater-crystallizer 39. Crystallization is essentially complete in the first 3 or 4″ of travel in the example unit 39, and this corresponds to about the first 1–3 seconds of impact.

The temperature of the material within beater-crystallizer 39 is kept below a critical limit by forcing air through the beater-crystallizer 39, that is, from 46a to 48a along with the sugary material. This forced air flow is necessary to attainment of a superior product, as will be detailed hereinafter. It is desirable to operate beater-crystallizer 39 so that the sugar product issuing therefrom via line 49 contains a minimum of oversize product. This condition is favored by carrying out the crystallization operation and by operating beater-crystallizer 39 so that the crystallization occurring within beater-crystallizer 39 takes place in the substantial absence of liquid water, such as may be produced by the condensation of the water vapor emanating from the syrup within crystallizer 39. In the operation of beater-crystallizer 39 the moisture content of the sugar product issuing therefrom via line 49 should be below about 2.5% and preferably should have a low inherent moisture content (1.5%) and the sugar product should be of such size that it may be dried to a satisfactory lower moisture content to yield a non-caking, flowable product, such as below about 0.7% by weight, in a relatively short time. Also, the sugar product issuing from crystallizer 39 should not be laden with re-condensed water vapor. Water vapor absorbed by the aggregates of the fondant-size sucrose crystals during re-condensation adversely affects the anti-caking properties of the final sugar product. The aforesaid air forced from 46a to 48a also completely eliminates both moisture problems, in that it removes any moisture which tends to be released or re-condensed during crystallization. Also, as aforesaid, the extremely rapid crystallization releases inherent moisture so efficiently as to tend to prevent the presence of excess moisture in the product discharged at 49 by virtue of the forced air flow.

In the operation of beater-crystallizer 39 the microscopic, fine, fondant-size sucrose crystals present in the product issuing from the beater-crystallizer 39 via line 49 results from the aforesaid very rapid crystallization of the sucrose from the highly concentrated hot syrup supplied to beater-crystallizer 39 via line 41. Rapid crystallization of the syrup within beater-crystallizer 39 produces a material characterized by extremely fine, such as crystals having a particle size in the range 3–50 microns, sucrose crystals making up the aggregates in the final sugar product. The aggregates thus produced are substantially dry, that is, sensibly dry.

At 1000 r.p.m., the example Turbulizer already described, having a 9" shaft 39a with 1½" wide blades 39b whose center of area is about 3" from the outer surface of shaft 39a, attains a blade velocity (at the center of blade area) of about 4000 feet/minute or 67 feet/second. At this speed, the blades 39b act essentially as impactors of the syrup introduced at 41, and as aforesaid, the syrup is crystallized within 1–3 seconds. During the remaining retention time (the balance of at least 10 and preferably at least 30 seconds) the crystallized product is apparently rendered uniform in size and composition. It is a feature of the invention that the crystallization is carried out so quickly that the material is not held at an elevated temperature (whatever temperature) for an extended period, with danger of degradation or burning, which is of course deleterious to appearance, taste, and analysis.

The thermodynamics of the rapid crystallization conducted within the beater-crystallizer 39 are such that elevated temperatures (albeit of short duration) cannot be avoided by water jacketing. The temperature gradient would be too steep to avoid re-condensation of water yielded during crystallization. Instead it has been found that a forced air flow from 46a to 48a under the influence of fans 46 and 48 is necessary to keep the sugary contents of the interior of the beater-crystallizer 39 below a critical temperature which causes burning, and that the forced air flow is also necessary to remove the moisture yielded during crystallization before it can re-condense and cause non-uniformities in the product.

It is an important feature of the invention that when an impact-type beater-crystallizer 39 is employed, and the proper volume of forced air flow from 46a to 48a is employed, the syrup feed at 41 may vary appreciably in concentration (e.g. 94–96% solids) and other qualities, and yet the product produced at 49 will not be adversely affected thereby, that is, will not be rendered non-uniform. This is an advance of immense practical significance, for as aforesaid, uniform quality particularly in appearance and taste is of the utmost importance in a table or cooking product such as sugar.

It has been found that when no air is supplied via 46a to 48a, that is, when the ports to the beater-crystallizer 39 of FIGURE 2 are closed off, the product at 49 while uniform in grain size, has a non-uniform color, non-uniform agglomerates, a non-uniform analysis, and is discharged at an excessively elevated temperature. When the proper flow of forced air is put through via the fans 46, 48, the non-uniformities disappear, and the discharge temperature drops appreciably. When the ports 46a, 48a, of FIGURE 2 are opened, but fans 46, 48, are not connected, that is, when only entrained air enters the beater-crystallizer 39 via port 46a, the results are even worse than when the ports 46a, 48a, are closed off altogether. Thus the entrained air brings in extra moisture, that, it has been found, causes non-uniformity of aggregates and excessive moisture in the product even worse than the aforesaid example wherein the ports 46a and 48a are closed altogether.

The amount of forced air which must be put through the beater-crystallizer 39 to achieve the desired product naturally varies with the through-put rate of sugary material through the beater-crystallizer 39, but in general to be operable the volume must be at least sufficient to prevent any appreciable temperature build-up in the sugary material in progress in the beater-crystallizer 39 (despite the large friction source in the interaction of paddles 39b with the sugary mass) so that burning or incipient burning does not take place. It has been found that the aforesaid amount of air flow is sufficient to remove all the moisture released within beater-crystallizer 39 during crystallization.

As is shown in FIG. 3, the combined impact beating and forced air treatment step follows the step of preparation of a suitable feed syrup for feed 41. The resultant product produced in the impact beating and forced air treatment step is so superior as to the criteria already mentioned, that simplified modes of drying, cooling and sizing are also possible. As aforesaid, the whole flow-process is beneficially affected by the excellent results of the impact beating and forced air treatment step, in that less criticality is necessary in those other steps, e.g. in the concentration of the feed syrup. In FIG. 3 the product of the impact beating and forced air treatment step is subjected to drying, cooling, and sizing as product.

The following examples will illustrate the invention.

*Example I*

A Turbulizer manufactured by the same manufacturer mentioned above, and with the same basic design, but having lower capacity was employed in Pilot plant studies. The relevant dimensions of this Turbulizer were 14" inside cylindrical 39d diameter, 24" from feed inlet 41 to outlet 49, 3" shaft 39a diameter, and 30° blade 39b pitch. A feed syrup having a purity of 93% at 125° C. having Brix of 95% total solids at a rate of 15 lbs. solids per minute was supplied to this Turbulizer. The Turbulizer was run at 2000 r.p.m., and the air ports were completely closed off. The crystallized product was collected and found to be at 140° C., to have non-uniform agglomerates, non-uniform color, and non-uniform analysis. A burned taste and odor was evident. The aggregate size was poor insofar as could be determined in the burned condition.

*Example II*

Example I was repeated lowering the speed to 1250 r.p.m. The product evidenced less burned odor and taste and less non-uniformity of analysis and color (but still objectionable as to each). The product was plastic and undesirable.

*Examples III, IV*

Examples I and II were repeated, but entrained air was allowed into the Turbulizer by opening the ports thereof. The burned effects were lowered (but still objectionable) but the product was in general worse than that of Examples I and II in that grain size was more non-uniform and moisture content was so varied in distribution throughout the bulk so as to render the product unusable. The product discharge temperature was 120–130° C.

*Example V*

Example II was repeated, but with forced air flow of 300 c.f.m. (20 cu. ft. air per pound sugar solids). The product was uniform in all respects, had no burned odor or flavor, and moisture content was 0.9% by weight. The product discharge temperature was 110° C.

*Example VI*

The Turbulizer as described herein (i.e., the 20" outside diameter example apparatus described prior to these examples) was charged with syrup at the temperature and having the make-up of that employed in the previous examples. This Turbulizer was run at 1250 r.p.m., and 1500 c.f.m. of air (15 cu. ft. air per pound sugar solids) was forced through ports 46a, 48a, the entering air being at ambient of 32° C. The retention time was estimated to be 30 seconds. The product discharge temperature was 110° C. The product was observed to be of uniform color (having a high bloom), uniform grain size, with uniform agglomerates, uniform analysis, and only 1.1% by weight moisture.

*Examples VII, VIII, IX*

Example VI was repeated with varying feed-syrup purities, as follows: 92%, 93%, and 94% purity. Each time, despite this change and other observable changes in the make-up of the feed syrup, the observed product did not observably change.

*Example X*

Example VI was repeated, and the speed of the Turbulizer (r.p.m.) was varied while the volume of air put through was also varied. It was found that the product was as good in all respects as that of Example VI, provided the forced air flow was raised when the shaft speed was substantially raised. When the shaft speed was substantially raised without raising the air volume, incipient burning effects began to be noticeable.

The product produced in Example VI was dried, cooled, and sifted in accordance with procedures already described, and was found to have the screen analysis indicated below at Table III.

TABLE III

| Size | Unmilled | Milled |
|---|---|---|
| +14 mesh | 40.0 by wgt | 0.0 by wgt. |
| −14 mesh to +48 mesh | 52.0 by wgt | 70.0 by wgt. |
| −48 mesh | 8.0 by wgt | 30.0 by wgt. |

It is a feature of the invention that the −14, +48 mesh fraction of the screen analysis (unmilled) is very much larger than with non-impact type crystallization, and also that the +14 mesh fraction and the −48 mesh fraction are sharply decreased.

It has been found that impact beating in the example Turbulizer having the 20" outside diameter recited, may proceed at an r.p.m. corresponding to about 30 feet/second to 150 feet/second paddle velocity at the center of area thereof. The preferred range of paddle velocity is 50–85 feet/second. The paddle geometry and the angle of setting thereof has no primary effect on the rapid crystallization itself, that being a impact phenomenon. However, of course, they do affect retention time and the like, as already pointed out. It has been found that with the aforesaid paddle mean-velocities, air should be forced through as required up to about 3000 c.f.m., depending on requirements with a given feed syrup, so that incipient burning is not involved. This latter can be attained by monitoring the material in process within the beater-crystallizer 39 to keep the sugar from increasing in temperature therein, or simply by adjusting the c.f.m. of air forced through by noting when incipient burning effects appear and adjusting the volume upward to eliminate them. Any such volume of air will perform the additional necessary function of initially cooling the syrup feed 41 just after it enters the crystallizer 39 so that crystallization is enhanced by the resultant saturation effect on the entering syrup. Consequently the other criteria mentioned will control the selection of the desired forced air flow.

The through-put of sugary material may vary widely, depending upon adjustment of the blade 39b pitch, the shaft speed, etc., in response to changes in the product appearance, moisture content, etc. When the through-put of sugary product is about 135 lb./minute (with the described 20" outside diameter 39b dimension Turbulizer) it has been found that about 1500 c.f.m. of air through-put gives good results. In general when the through-put of product varies the necessary minimum c.f.m. of air through-put also tends to vary. It has been found that the ratio of c.f.m. air through-put to lb./minute sugary product through-put gives satisfactory results between about 9 c.f.m./lb./min. to about 20 c.f.m./lb./min.

It will now be appreciated that the discovery that a concentrated sugar syrup can be successfully impact-beaten at high velocities has resulted in a distinct advance in the art. The syrup does not jam-up into a dough, as was expected and predicted, but actually produces a superior product in a superior fashion. The very rapid crystallization means that moisture content right out of the crystallizer 39 itself is lowered, and consequently that lower quality syrups can be employed. This relative lack of sensitivity to syrup quality results in the ability to use more widely varying feed syrups with a relatively uniform product for the first time. Additionally, the rapid crystallization and low retention time combine to defeat, when the proper volume of air is employed, the non-uniformities in analysis, crystal-size, agglomerate-size, and color that otherwise tend to occur. A high bloom is attained without additives, for the first time. Finally, the whole practical flow process is improved, beyond the inventive steps themselves, because the invention requires less critical feed syrup than before, less subsequent drying, less special screening, and the like. Consequently a more efficient, flexible, and economical overall process is attained. The mere fact alone that feed syrup purity may vary widely without substantially affecting the product's appearance, caking resistance, moisture content, and the like, is an important practical advance.

While the invention has been described with a certain degree of particularity, it should be understood that certain changes may be made without departing from the spirit and scope of the invention. The embodiments described herein are illustrative, not limiting.

What is claimed is:

1. A method which comprises concentrating a sugar syrup at a temperature in the range from about 120° C. to about 130° C. to about 91–97% by weight solids, said sugar syrup containing not more than 15% by weight non-sucrose solids comprising materials selected from the group consisting of invert, corn syrup, potato syrup, dextrose, maltose, lactose and molassegenic components of black strap molasses based on the solids content of said syrup; subjecting a stream of the resulting concentrated sugar syrup to impact beating within a crystallizing zone; subjecting said syrup during said impact beating to a forced gas flow through said crystallizing zone at least sufficient to prevent increase in the temperature of said syrup and any resulting product therefrom and to carry off any water vapor produced within said crystallizing zone, said gas flow and said syrup and any resulting sugar product therefrom being in intimate admixture within said crystallizing zone during said impact beating; the retention time of the sugar thus-introduced to said crystallizing zone being in the range from about 10 seconds to about 60 seconds; and recovering from said crystallizing zone a granular sugar product comprising aggregates of fondant-size sucrose crystals having a size in the range 3–50 microns, said granular sugar product having less than 2.5% by weight moisture.

2. A method in accordance with claim 1 wherein said forced gas flow is a forced air flow at a rate in the range from about 9 cubic feet per minute per pound of sugar product per minute to about 20 cubic feet per minute per pound of sugar product per minute.

3. A method according to claim 1 wherein said granular sugar product is further subjected to cooling and drying to produce a final granular product comprising an aggregate sugar containing not more than about 1.0% by weight moisture.

4. A sugar product comprising aggregates of fondant-size sugar crystals produced in accordance with claim 1.

References Cited

UNITED STATES PATENTS

| 988,261 | 3/1911 | Griere | 127—58 |
| 1,031,559 | 7/1912 | Kestner et al. | 127—58 |
| 1,309,425 | 7/1919 | Shaw et al. | 127—58 |
| 3,247,021 | 4/1966 | Steele et al. | 127—58 X |

MORRIS O. WOLK, *Primary Examiner.*

MICHAEL E. ROGERS, *Examiner.*

S. MARANTZ, *Assistant Examiner.*